(12) United States Patent
Pap

(10) Patent No.: US 7,300,026 B2
(45) Date of Patent: Nov. 27, 2007

(54) ERGONOMIC AND MASSAGING COMPUTER INTERFACE SUPPORT SURFACES

(76) Inventor: Zsolt Pap, 11588 E. Bayaud Dr., Aurora, CO (US) 80012

( * ) Notice: Subject to any disclaimer, the term of this patent is extended or adjusted under 35 U.S.C. 154(b) by 0 days.

(21) Appl. No.: 10/471,301

(22) PCT Filed: Mar. 11, 2002

(86) PCT No.: PCT/US02/07303

§ 371 (c)(1),
(2), (4) Date: Sep. 8, 2003

(87) PCT Pub. No.: WO02/071896

PCT Pub. Date: Sep. 19, 2002

(65) Prior Publication Data

US 2004/0089771 A1    May 13, 2004

Related U.S. Application Data

(60) Provisional application No. 60/274,865, filed on Mar. 9, 2001.

(51) Int. Cl.
*B68G 5/00* (2006.01)
(52) U.S. Cl. .................. 248/118; 248/346.01; 601/122
(58) Field of Classification Search ............ 248/118.1, 248/118, 918, 118.3, 118.5, 346.01, 346.05; 400/715; 601/22, 27, 122, 128, 115, 118, 601/126; D24/211, 214, 215
See application file for complete search history.

(56) References Cited

U.S. PATENT DOCUMENTS

| | | | | |
|---|---|---|---|---|
| 2,638,089 A | * | 5/1953 | Murphy | 601/27 |
| 3,083,709 A | * | 4/1963 | Lengsfeld | 601/126 |
| 3,088,458 A | * | 5/1963 | Stewart | 601/122 |
| 3,292,614 A | * | 12/1966 | Fleming | 601/122 |
| 3,415,514 A | * | 12/1968 | Weihs | 482/79 |
| 3,434,715 A | * | 3/1969 | Brantingham et al. | 482/79 |
| 4,198,962 A | * | 4/1980 | McCauley | 601/63 |
| 4,531,513 A | | 7/1985 | Liming | |
| 4,832,006 A | * | 5/1989 | Kirsch | 601/122 |
| D305,563 S | * | 1/1990 | Yamasaki | D24/215 |
| 5,005,560 A | * | 4/1991 | Quam et al. | 601/113 |
| 5,050,826 A | | 9/1991 | Johnston | |
| 5,056,507 A | * | 10/1991 | Yum | 601/136 |
| 5,203,845 A | | 4/1993 | Moore | |
| 5,228,655 A | | 7/1993 | Garcia et al. | |
| 5,251,620 A | * | 10/1993 | Boucher et al. | 601/122 |
| 5,288,042 A | * | 2/1994 | Grimm | 248/118 |

(Continued)

FOREIGN PATENT DOCUMENTS

CH    658989 A5 * 12/1986

(Continued)

*Primary Examiner*—A. Joseph Wujciak, III
(74) *Attorney, Agent, or Firm*—Heimbecher & Assoc., LLC

(57) ABSTRACT

An ergonomic support surface (2) is disclosed that supports a user's hand or wrist while moving in contact with the ergonomic support surface (2) to control a hand activated device, for example, a computer mouse on a mouse pad (6). The ergonomic support surface (2) may comprise a base (4) with a support structure (7) upon which the user's wrist or hand rests. The support structure (7) provides a massaging member, for example, a roller (8) that imparts a massaging action to the user's hand or wrist while the user's hand or wrist moves in contact with the supporting structure (7).

25 Claims, 9 Drawing Sheets

U.S. PATENT DOCUMENTS

| | | | |
|---|---|---|---|
| D349,772 S * | 8/1994 | Yamasaki et al. | D24/215 |
| 5,348,408 A * | 9/1994 | Gelardi et al. | 400/715 |
| 5,467,950 A | 11/1995 | Dumitru | |
| 5,478,034 A | 12/1995 | Cunningham et al. | |
| 5,556,061 A | 9/1996 | Dickie | |
| 5,562,270 A | 10/1996 | Montague | |
| 5,635,955 A * | 6/1997 | Maynard, Jr. | 345/157 |
| 5,674,185 A * | 10/1997 | Chang | 601/122 |
| 5,727,759 A | 3/1998 | Christensen | |
| 5,829,899 A | 11/1998 | Chao | |
| 5,830,161 A * | 11/1998 | Cosmano | 601/121 |
| 5,971,331 A | 10/1999 | Getsay | |
| 6,056,247 A | 5/2000 | Hoglund | |
| 6,092,867 A | 7/2000 | Miller | |
| 6,135,399 A | 10/2000 | Savoie et al. | |
| 6,196,984 B1 * | 3/2001 | Hashimoto | 601/122 |
| 6,216,988 B1 | 4/2001 | Hsu et al. | |
| 6,357,703 B1 | 3/2002 | DiOrio | |
| 6,402,101 B1 | 6/2002 | Yates | |
| 6,547,193 B2 * | 4/2003 | Money et al. | 248/118 |
| 6,547,194 B1 | 4/2003 | Harvey | |
| 6,679,857 B1 | 1/2004 | Bastia | |
| 6,962,311 B1 | 11/2005 | Sykes | |

FOREIGN PATENT DOCUMENTS

| | | |
|---|---|---|
| DE | 3229410 A1 * | 3/1983 |

* cited by examiner

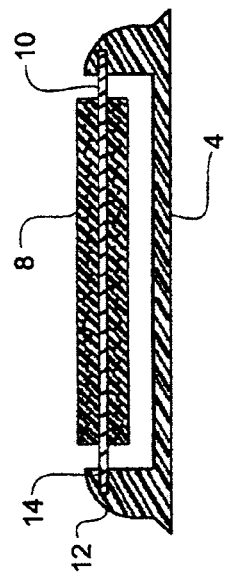
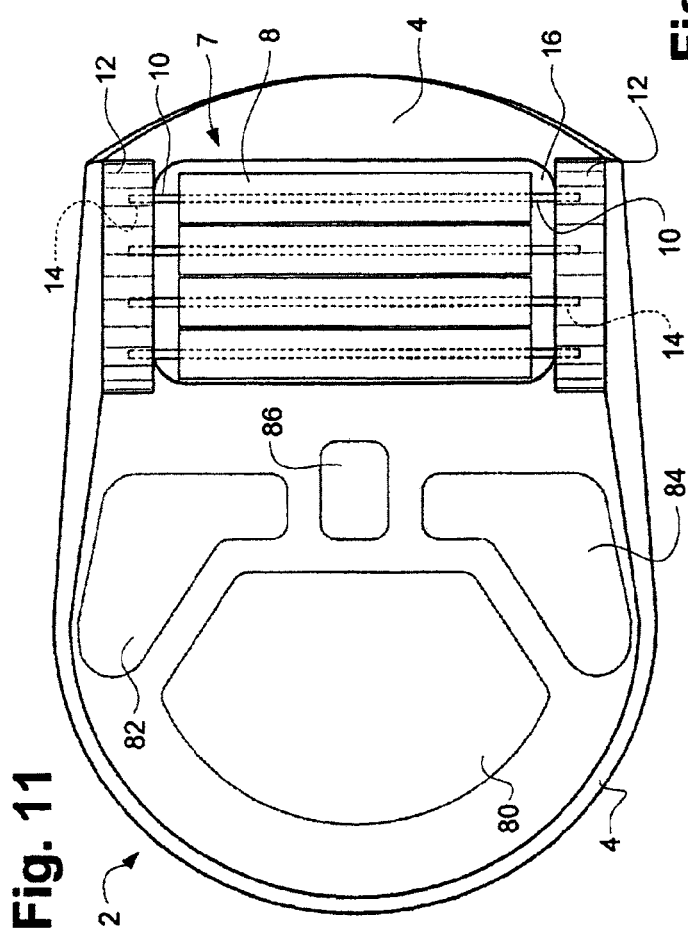
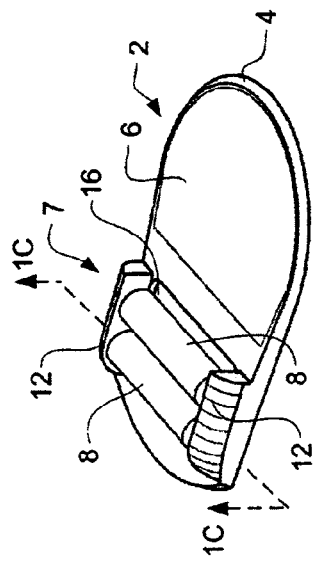
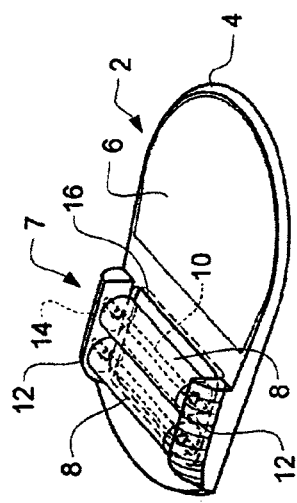

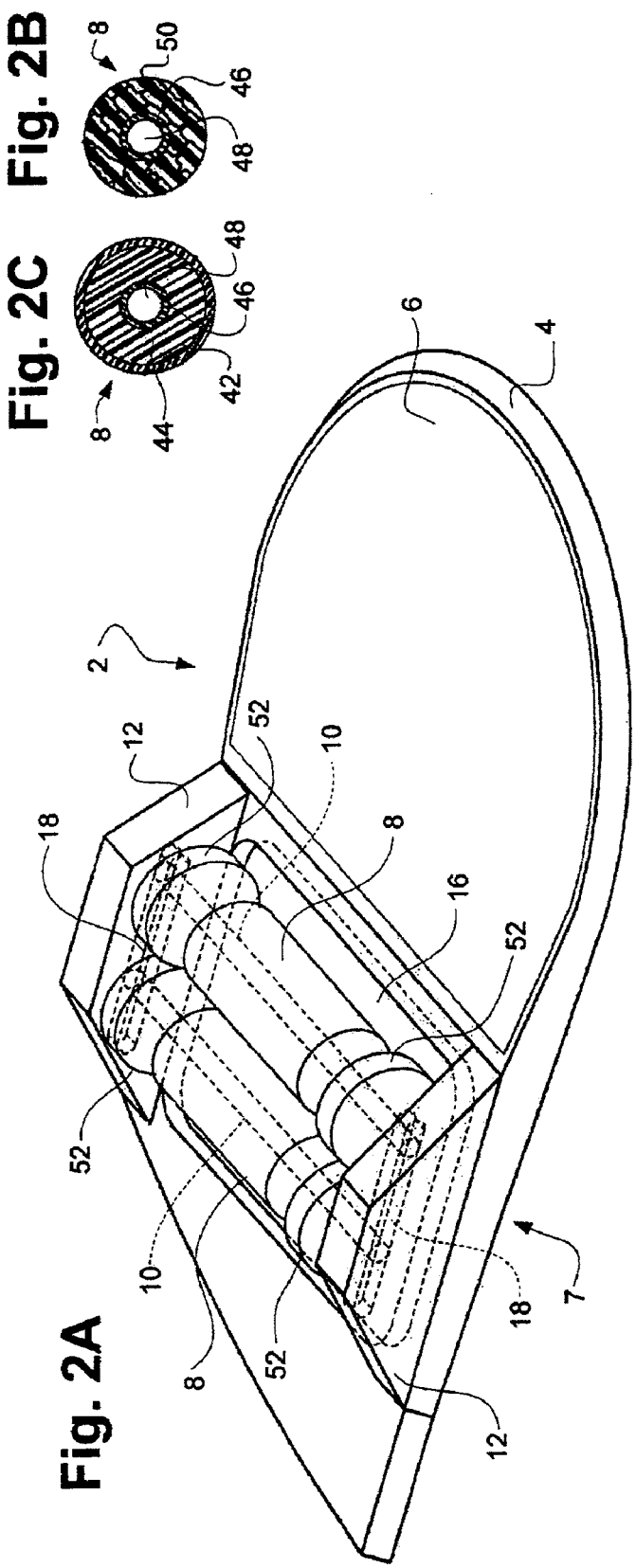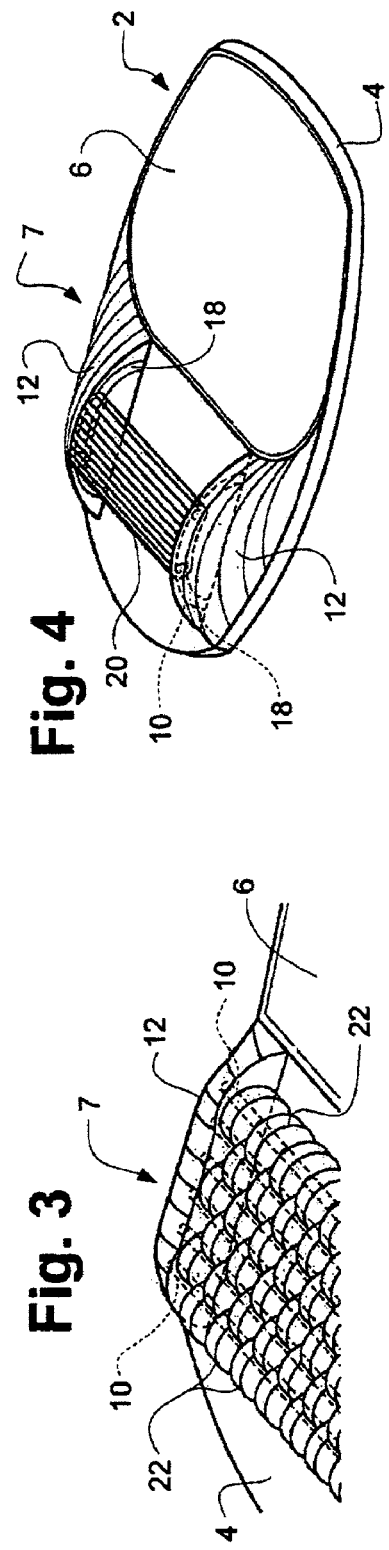

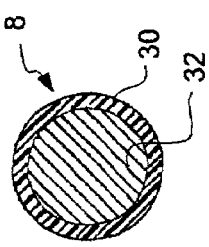
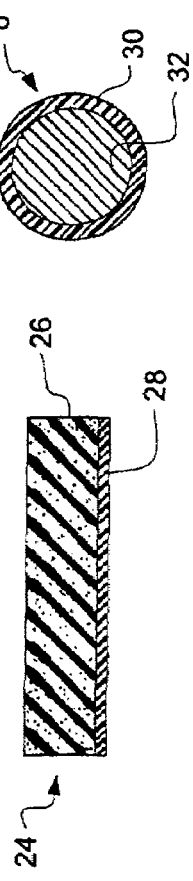
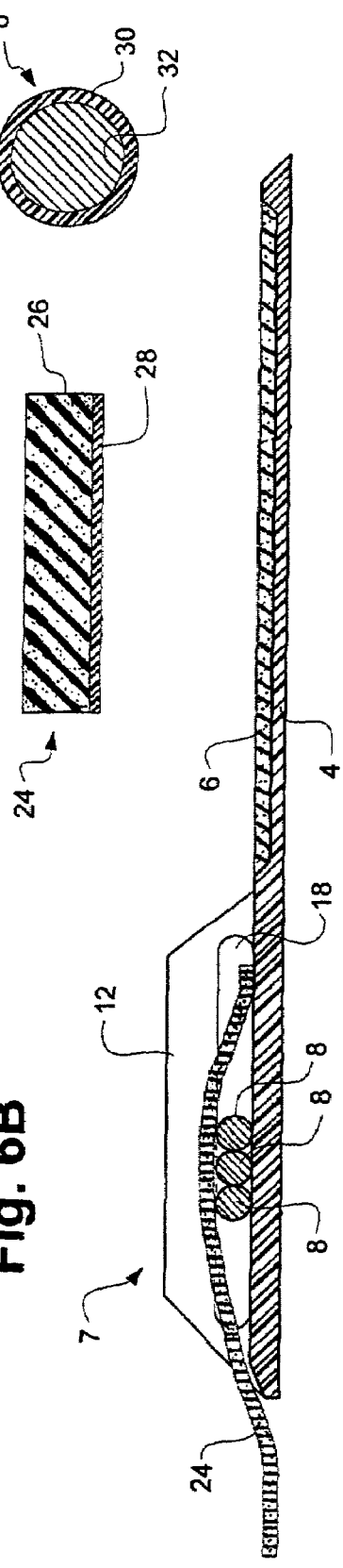
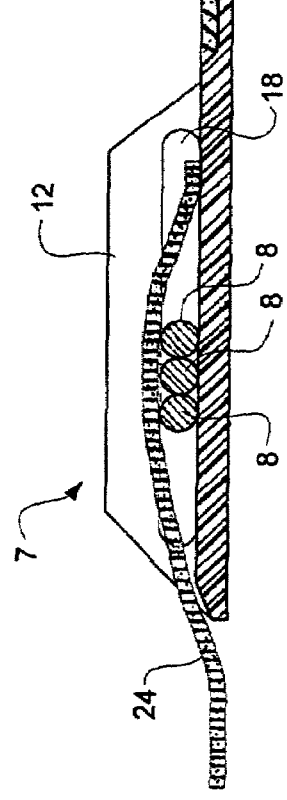
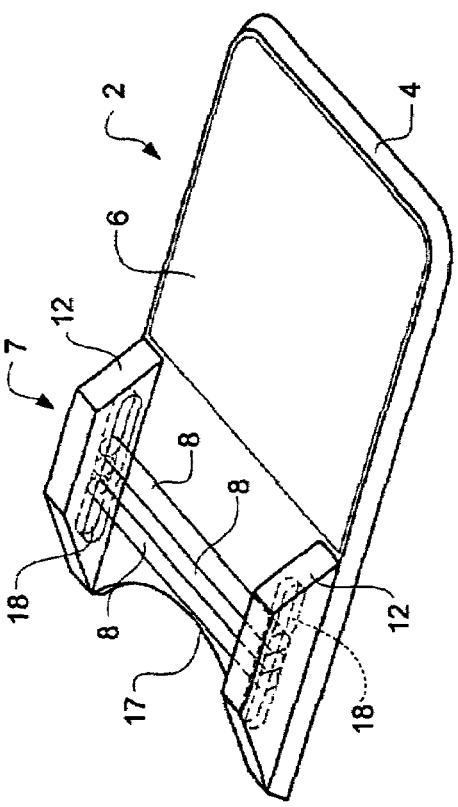

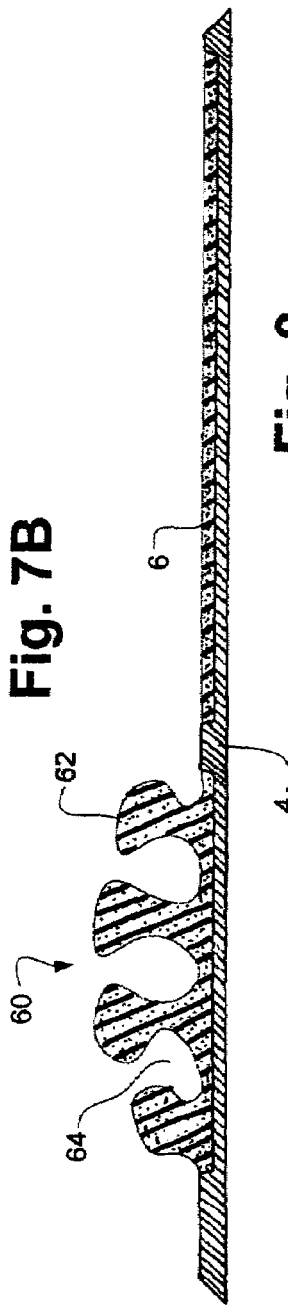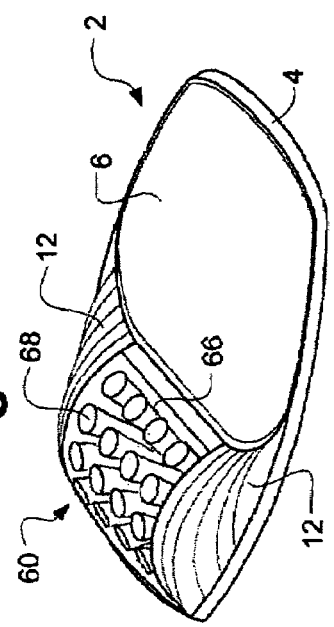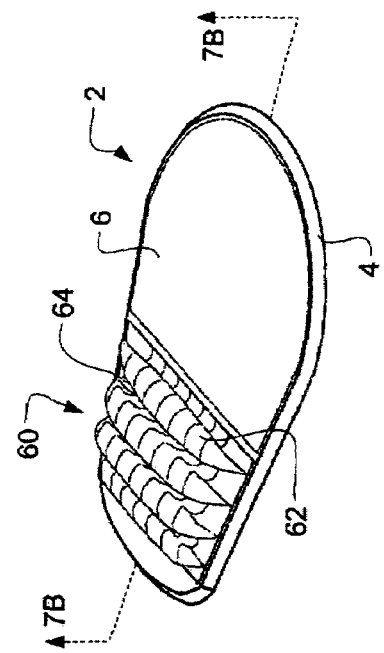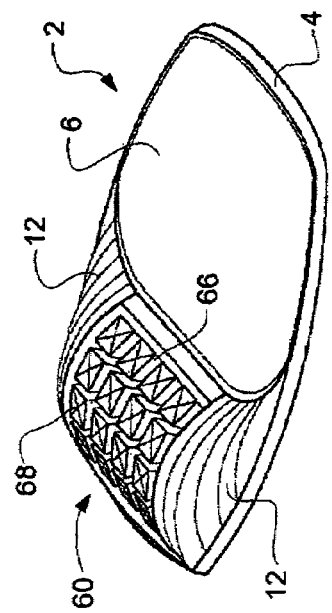

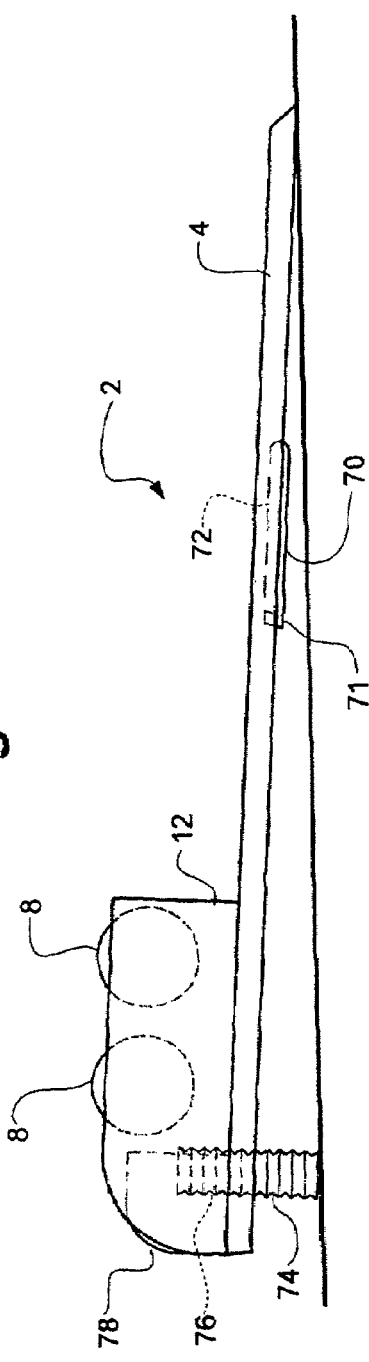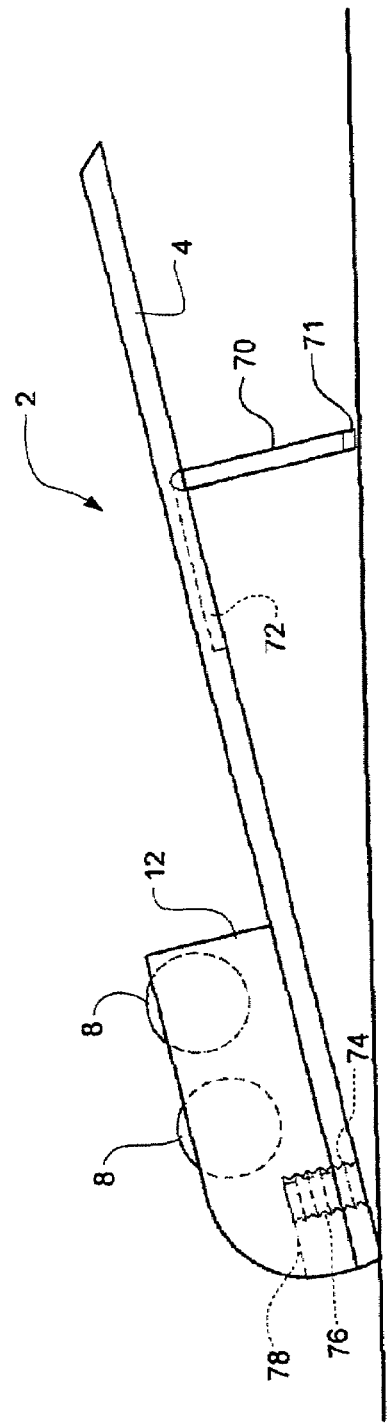

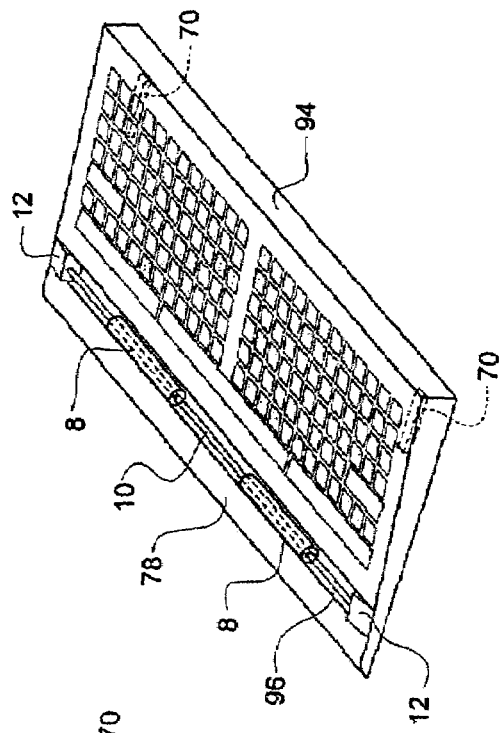
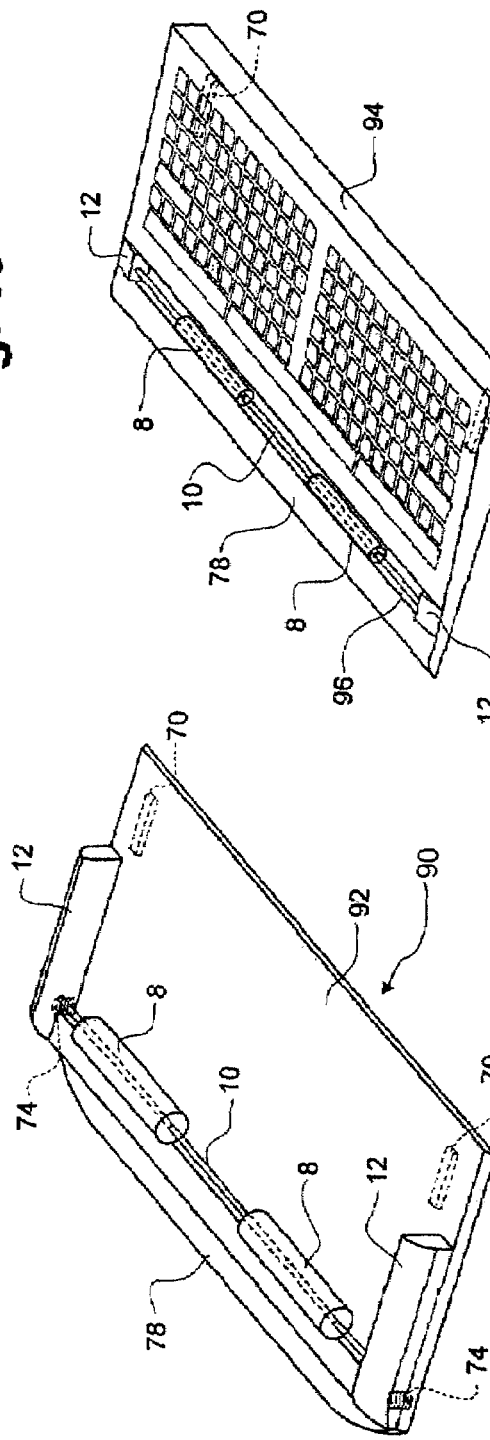
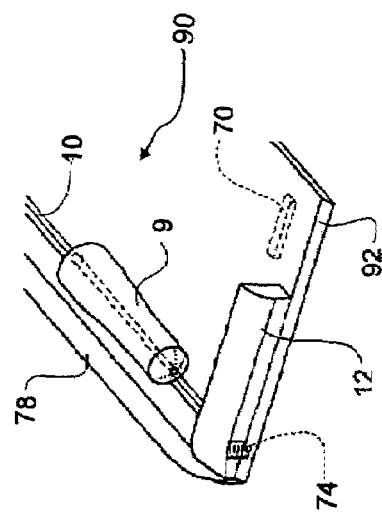

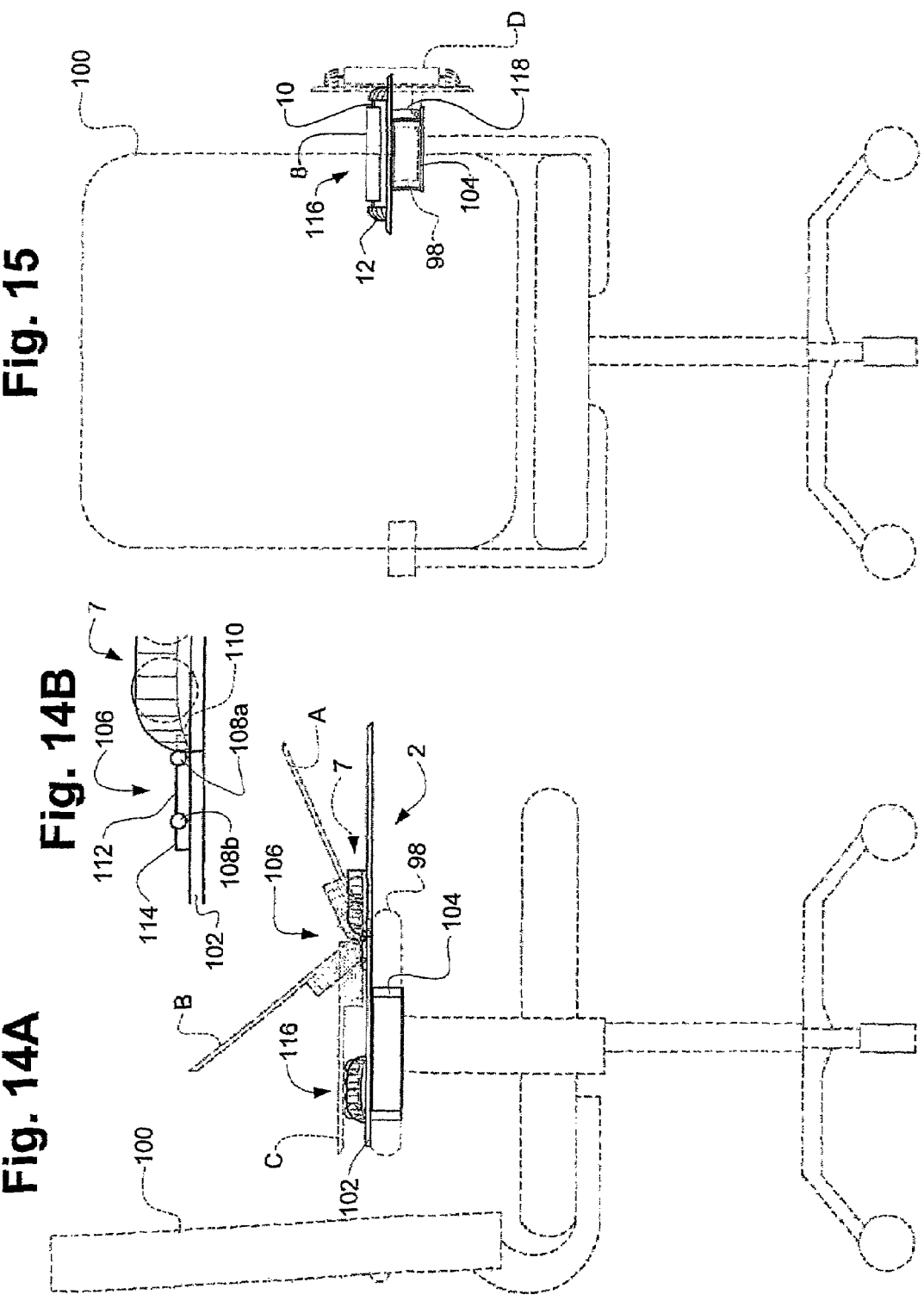

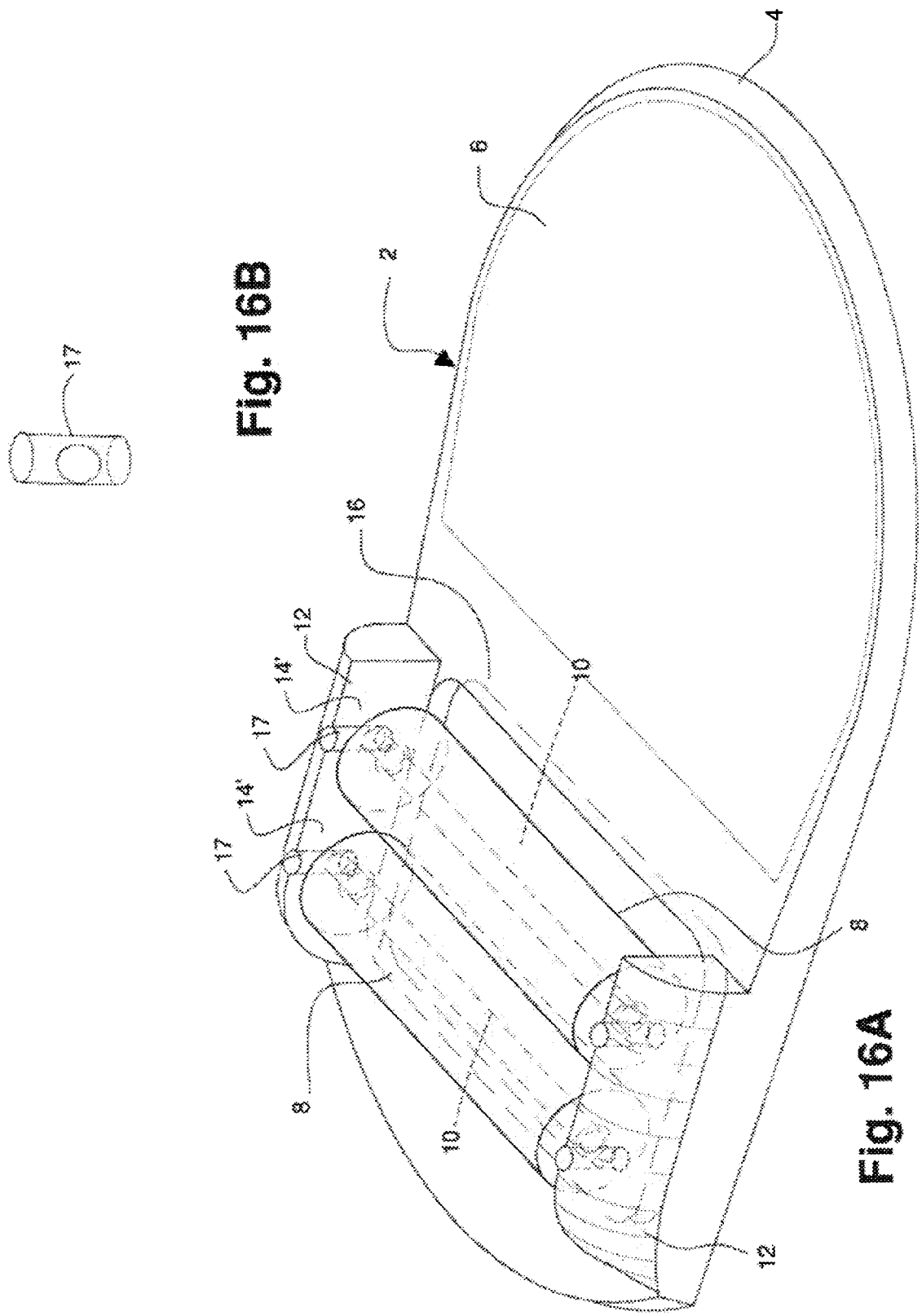

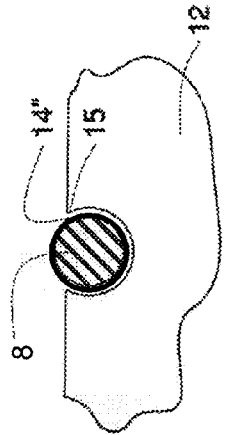
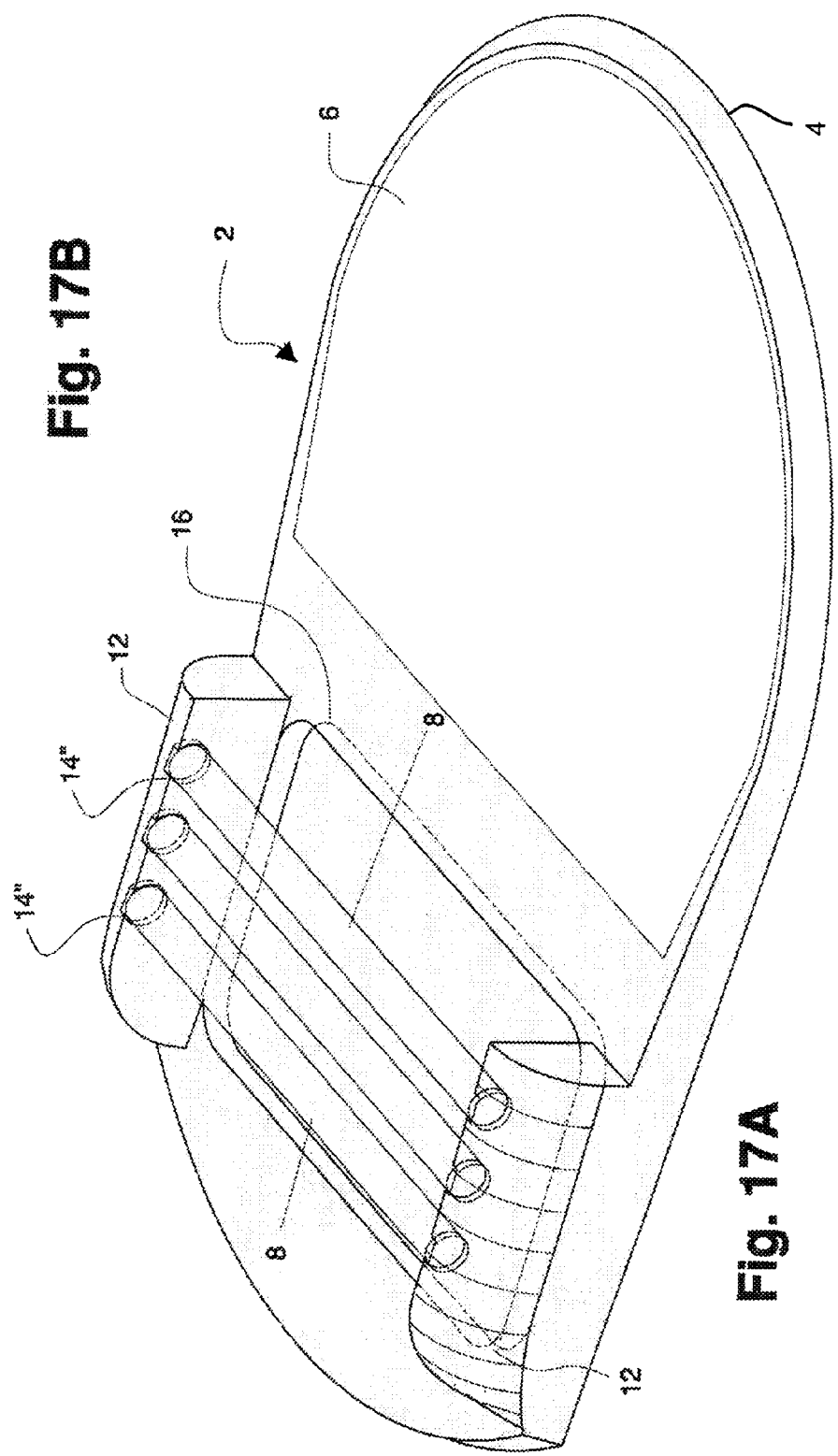
Fig. 17B
Fig. 17A

ERGONOMIC AND MASSAGING COMPUTER INTERFACE SUPPORT SURFACES

CROSS REFERENCE TO RELATED APPLICATIONS

This application claims the benefit of priority of U.S. provisional patent application Ser. No. 60/274,865 filed 9 Mar. 2001 entitled "Ergonomic and Massaging Computer Interface Support Surfaces," which is hereby incorporated by reference as though fully set forth herein.

BACKGROUND OF THE INVENTION

1. Field of the Invention

This invention is related generally to computer peripheral support surfaces and more particularly to the augmentation of such computer peripheral support surfaces in order to provide ergonomic support and massaging benefits to a user.

2. Description of Related Art

Most of the currently available mouse pads, keyboard pads, and other similar supports for users working with computer interface equipment on the market today are primarily designed to aid the accessibility and maneuverability of the mouse, keyboard, or other interface equipment without taking into account the prolonged effect they might have on the physical health of the computer operator. The user's forearm muscles are under constant stress, as the user must use them to perform the various movements involved in working with a computer mouse or other interface equipment. Incorrect hand, arm, or shoulder alignment cause further trauma to the hands or wrists, as the hand is forced into an unnatural position while working.

In a situation where the user has to work with a computer all day the extended use of the mouse or other interface equipment can lead to several physical health problems such as cumulative trauma disorder, repetitive stain injuries, or carpal tunnel syndrome. The effects of these disorders range from local fatigue and soreness; numbness and tingling; and even complete loss of strength of the hand. In some cases the user becomes unable to perform regular job duties leading to eventual loss of work, time, and earnings. The curative medical expenses can be considerable as well.

There have been some attempts to alleviate the mal effects of working with computer interface equipment. Most notably are keyboard pads upon which a user's palms may rest to support the hands while typing. Such keyboard pads are generally a foam, encased gel, or plastic pad running the length of the keyboard, placed upon a work surface in front of the keyboard. This same pad design has been incorporated into mouse pad assemblies as well. These conventional keyboard and mouse pads are static in response to a user's movement of the hand and wrist, although if the surface of the pad is soft, e.g., foam, the pad may compress under the weight of the user's hand and wrist. These designs can place pressure over a relatively small, static area of the hand and wrist, thereby restricting blood circulation and correct nerve functioning.

SUMMARY OF THE INVENTION

The computer peripheral support surfaces disclosed herein effectively meet the need for ergonomic improvement in keyboard and mouse pad design by both supporting the hand and wrist in a natural position and imparting a massaging action or sensation to the hand and wrist of a user. The invention massages the wrist thereby improving blood circulation so the hand does not become tired. The invention further helps to relax the forearm while working at a computer. The upper arm supports the hand rather than the fingers and the wrist. The pressure points on the hand and wrist always change, thus blood circulation is effectively stimulated. Through the use of the inventive support surfaces disclosed herein, the hand is always relaxed and it is not therefore necessary to take a break to rest it.

The computer interface support surfaces facilitate the use of a mouse or other interface equipment by rolling, bending, or sliding forward, backward, and/or laterally. Different embodiments of the invention incorporate some or all of these movements. Some embodiments provide rollers on shafts as support surfaces. Another embodiment provides a soft carpet cover draped over rollers. A further embodiment provides contoured supporting superficies, stanchions, and columns that move with and massage a user's hand and wrist.

Support surfaces for use with keyboards are also disclosed and are designed to help support the hands of a person while typing on a computer keyboard also tend to restrict the free movement of the user's hands. The massaging keyboard support surfaces help relax the hands and wrists by massaging and stimulating the blood circulation. In one embodiment, the user's hands may move easily on rollers in each direction. When a user types with both hands, the user's hands may remain on the support surface while typing and, for example, if an out-of-reach character is needed, the user may move forward onto the rollers and then slide the rollers laterally to reach the desired key. This rolling and sliding action may further augment a user's ability to type with one hand while using a mouse with the other hand.

In one embodiment the support surfaces are mounted to the arm of a chair. In a further embodiment the supports surfaces may fold up and/or be rotated out of the way for the convenience of the user. The support surfaces may further be configured to support the elbow and forearm of a user.

BRIEF DESCRIPTION OF THE DRAWINGS

FIG. 1A is a perspective view of a computer interface support device with roller hand and wrist support surfaces according to a first embodiment of the invention.

FIG. 1B is a perspective view of the embodiment of FIG. 1A with dashed lines showing hidden structures not visible in FIG. 1A.

FIG. 1C is a cross-section of a front elevation view of the embodiment of FIG. 1A.

FIG. 2A is a perspective view of a computer interface support device with roller hand and wrist support surfaces according to a second embodiment of the invention. Dashed lines indicate hidden structures not otherwise visible.

FIG. 2B is a cross-section of a side elevation view of a first embodiment of a support roller of FIG. 2A.

FIG. 2C is a cross-section of a side elevation view of a second embodiment of a support roller of FIG. 2A.

FIG. 3 is a partial perspective view of a computer interface support device with roller hand and wrist support surfaces according to a third embodiment of the invention. Dashed lines indicate hidden structures not otherwise visible.

FIG. 4 is a perspective view of a computer interface support device with roller hand and wrist support surfaces according to a fourth embodiment of the invention. Dashed lines indicate hidden structures not otherwise visible.

FIG. 5 is a perspective view of a computer interface support device with roller hand and wrist supports according to a sixth embodiment of the invention. Dashed lines indicate hidden structures not otherwise visible.

FIG. 6A is a perspective view of a computer interface support device with a carpet over roller hand and wrist support surface according to a fifth embodiment of the invention. Dashed lines indicate hidden structures not otherwise visible.

FIG. 6B is a cross-section of a side elevation view of the embodiment of FIG. 6A.

FIG. 6C is a cross-section of a side elevation view of the carpet of FIG. 6A.

FIG. 6D is a cross-section of a side elevation view of a roller of FIG. 6A.

FIG. 7A is a perspective view of a computer interface support device with a support surface formed of multiple bulbous stanchions according to a seventh embodiment of the invention.

FIG. 7B is a cross-section of a side elevation view of the embodiment of FIG. 7A.

FIG. 8 is a perspective view of a computer interface support device with a support surface formedo multiple columns according to an eighth embodiment of the invention.

FIG. 9 is a perspective view of a computer interface support device with a support surface of multiple columns according to a ninth embodiment of the invention.

FIG. 10A is a side elevation view of a computer interface support device with an extended base elevator according to a tenth embodiment of the invention.

FIG. 10B is a side elevation view of a computer interface support device with an extended leg elevator according to an eleventh embodiment of the invention.

FIG. 11 is a top plan view of a computer interface support device with a computer touch pad interface according to a twelfth embodiment of the invention.

FIG. 12A is a perspective view of a computer keyboard support device with roller hand and wrist support surfaces according to a thirteenth embodiment of the invention.

FIG. 12B is a perspective partial view of a computer keyboard support device with contoured roller hand and wrist support surfaces according to a fourteenth embodiment of the invention.

FIG. 13 is a perspective view of a computer keyboard device integrated with roller hand and wrist support surfaces according to a fifteenth embodiment of the invention.

FIG. 14A is a side elevation view showing alternate positions of a combined, collapsible computer interface support device with roller hand and wrist support surfaces and roller elbow support surfaces according to a sixteenth embodiment of the invention.

FIG. 14B is a magnified partial side elevation view of the embodiment of FIG. 14A detailing an exemplary hinge structure.

FIG. 15 is a front elevation view showing alternate positions of an elbow support device according to a seventeenth embodiment of the invention.

FIG. 16A is an isometric view of an embodiment of the computer interface support device with a spring support for the roller shafts.

FIG. 16B is an isometric view of an exemplary spring support mechanism as used in FIG. 16A.

FIG. 17A is an isometric view of an embodiment of the computer interface support device depicting an alternate shaft retention structure.

FIG. 17B is an elevation view in partial cross section of a portion of the computer interface support surface of FIG. 17A depicting the alternate shaft retention structure.

DETAILED DESCRIPTION OF THE INVENTION

One embodiment of a computer interface support device 2 that provides ergonomic support and imparts a massaging action or sensation to the wrist and hand of a user according to the present invention is depicted in FIGS. 1A, 1B, and 1C. The support device 2 is configured in the depicted embodiment as a computer mouse pad, but may take other forms to support other computer peripheral devices, for example, drawing pads, plotting pads, track balls, and joysticks. The support device consists of a base 4, which supports a mouse pad 6 and a hand and/or wrist support 7.

The base 4 may be composed of, for example, plastic, composite, fiberglass, wood, metal, or any other sufficiently rigid material. Exemplary dimensions of the base may be 9 in. to 13 in. in length, 5 in. to 8½ in. in width, and ¼ in. to ½ in. in thickness. The base may be formed in any of numerous shapes, for example, generally rectangular, generally oval, straight sides with curved front and rear edges, and others. The base 4 may further have a beveled edge along portions of or its entire perimeter.

The mouse pad 6 may be affixed to the top surface of the forward portion of the support device 2. The support device 2 may have a recessed area in the top surface of the base 4 for accommodating the mouse pad 4, whereby the mouse pad 6 is embedded in the support device 2. The recess may be on the order of ⅛ in. to ¼ in. in depth, for example. The mouse pad 6 may be composed of any suitable material for supporting the movement of a computer mouse. Typical examples of materials used for mouse pads 6 are Neoprene®, rubber, foam, plastic, and fabric. The mouse pad may be between 1/16 in. and ⅝ in. thick, for example. The mouse pad 6 may further depict a label, trademark, logo, or other indicia for advertising or other purposes.

In the embodiment of FIG. 1A, the wrist support 7 consists of shaft supports 12 on each side of the support device 2 that hold one or more roller shafts 10, which, in turn, act as axles to one or more support rollers 8. The shaft supports 12 may be of unitary construction with the base 4 (as shown in FIG. 1C) or they may be separate structures firmly affixed to the base 4, for example, by screws, adhesive, or snap fastening. Exemplary dimensions of the rollers supports may be 2½ in. to 6 in. in length, ¼ in. to 1½ in. in width, and ¼ in. to 2 in. in height. The shaft supports 12 may be curved or beveled along the outside edge. For example, the radius of curvature of the outside edge, front to back, of the shaft supports 12 may be 0 in. to 2 in. at the mouse pad 6 end, and ½ in. to 3 in. at the user end of the support device 2, and if the top of the shaft supports 12 are curved, the radius of the arc may be ¼ in. to 2 in. The interior sidewall of the shaft supports 12 is flat and vertical.

The shaft supports 12 each contain one or more shaft sockets 14 into each of which an end of a roller shaft 10 is inserted. The shaft socket may be 3/16 in. to ¾ in. in diameter and ⅛ in. to ¾ in. in depth, for example. The shaft socket 14 may be augmented with a bearing for interfacing with the exterior surface of the roller shaft 10, to allow the roller shaft 10 to freely rotate around its longitudinal axis. Alternatively, the exterior surface of the roller shaft 10 and/or the surface of the shaft socket 14 may be made of a material that allows for such free rotation, for example, a Teflon® coating. Contrarily, each end the roller shaft 10 may be firmly set within the shaft sockets 14, whereby axial rotation of the shaft roller is prevented. Each end of the roller shaft 10 may be firmly positioned against the end surface of the shaft socket 14, or the roller shaft 10 may be shorter in length than the distance between the end surfaces of opposing shaft sockets 14, in which case the roller shaft 10 may move from side to side as well as rotate axially within the socket.

The roller shafts 10 are generally cylindrical rods, solid or hollow, and may be made of metal, fiberglass, Plexiglas®, wood, or other sufficiently rigid material able to support the hand and wrist of a user when supported only at each end. For longer spans than in a mouse pad embodiment, for example, for use with a computer keyboard as discussed herein with respect to FIGS. 12A, 12B, and 13, the roller shafts 10 may be supported by one or more further intermediate shaft supports 12. Exemplary dimensions of the roller shafts 10 may be, for example, 1/16 in. to 3/4 in. in diameter and 4 in. to 7 in. in length when used with a mouse pad, or up to 22 in. in length when applied to a keyboard configuration, as shown in FIGS. 14A and 15. The roller shafts 10 are spaced apart to allow for freedom of movement between the support rollers 8. For example, the roller shafts 10 may be spaced apart at a distance of 1/16 in. to 1/4 in. greater than the diameter of the support rollers 8 on the roller shafts 10.

Each roller shaft 10 is inserted axially through a shaft aperture 48 (see FIG. 2B) in a support roller 8. The shaft aperture 48 may be a cylindrical tube running the length of the roller 8, and may be up to 25/32 in. in diameter, for example. In an alternative embodiment, the roller shaft 10 may be integral with the support roller 8, as a spindle, wherein the support roller 8 mounts directly in the shaft sockets 14. The support rollers 8 are the actual structure in this embodiment of the support device 2 upon which the user's wrist rests and is supported. The support rollers 8 support the user's hand and wrist so that the hand and wrist can achieve a natural position during operation of the computer peripheral device. The rollers 8 may rotate continuously around the shafts or they may be fixed to the roller shafts 10, which, in turn, rotate within the shaft sockets 14 in the shaft supports 12. In this manner, the rollers 8 facilitate to use of a computer mouse or other peripheral device by rotating about the center axis of the support rollers 8, allowing the user's wrist and hand to move linearly, forward and backward, while simultaneously imparting a massaging sensation to the wrist and hand. Further, the roller 8 may move axially, back and forth, along the length of the roller shaft 10, or, alternatively, the roller shaft 10 may move axially within the shaft sockets 14, allowing the user's hand and wrist to move laterally as well when operating the computer mouse.

There may be one or more support rollers 8 and associated roller shafts 10 in this and similar embodiments of the support device. The rollers 8 may be cylindrical or contoured symmetrically about a central axis (see, e.g., FIG. 12B). Exemplary dimensions may be 1/4 in. to 1 3/4 in. in diameter and 3 in. to 6 1/2 in. in length. The ends of the rollers may be rounded-off, for example, at a radius of 0 in. to 1/2 in. The support roller 8 may be constructed of a single material forming the support roller body 50, as shown in FIG. 2B, or of a combination of multiple materials or structures in layers, as shown in FIG. 2C. For example, the support roller body 50 may be made of plastic, composite, fiberglass, metal, wood, hard or soft sponge, rubber, foam, and Neoprene®. Alternately, as depicted in FIG. 2C, the support roller 8 may consist of a harder support roller core 44, for example, wood or plastic, surrounded by a softer support roller surface 42, for example, textured rubber or foam. Further, the support roller 8 may further include a support roller bearing 46, or other low friction surface, e.g., Teflon®, surrounded by the support roller core 44 or support roller body 50, lining the support roller shaft aperture 48. The support roller bearing 46 may enhance the rotation of the support roller 8 around the roller shaft 10.

The height of the support rollers 8 is dependent upon, and may be varied for user comfort, by changing one or more of several variables. In fact, when a support device 2 is provided with multiple support rollers 8, each support roller 8 may be at a different height to provide appropriate ergonomic support or varied contact sensations to the user. The shaft sockets 14 in the shaft supports 12 may be varied in their height above the top surface of the base 4 of the support device 2. Further, an aperture or recess 16 may be formed in the base 4 underneath the support roller 8, providing additional clearance for a lower positioning of the support rollers 8. See FIGS. 1A and 1B. Alternately, the back end of the base 4 may be formed as a concave curve 17 or other cutout, shown generally in FIG. 5. This cut-out may provide additional clearance for a user's hand and wrist over a work surface, for example, if the work surface is at an incline, reducing the possibility of the user's hand or wrist from rubbing against the work surface. In a further embodiment (not shown), the concave curve 17 may extend underneath the support rollers 8 between the shaft supports 14 to provide additional clearance for lowering the support rollers 8. The height of the support rollers 8 may also be increased or decreased by merely changing the radial thickness of the material forming the support rollers 8 themselves.

In an alternative embodiment, the height of the support rollers 8 may further be variable correlating to the pressure placed upon the support rollers by the hand and wrist of the user. In this embodiment, as shown in FIGS. 16A and 16B. the shaft sockets 14' may be vertically elongated and house a spring structure 17, for example, in the base of each of the shaft sockets 14'. Exemplary dimensions of such vertical elongations to the shaft sockets 14' may be 3/32 in. to 3/4 in. in width, 1/4 in. to 1 in. in height, and 1/8 in. to 3/4 in. in depth. In this configuration, the spring structure 17 would resist minimal pressure by the user and the support rollers 8 would remain at an upper elevation. Under increased pressure by the hand and wrist of the user, however, the spring 17 would contract under the pressure and the elevation of the support rollers 8 would decrease. An exemplary minimum distance between the lower plane of the elongated shaft socket 14' and the upper plane of the base 4 underneath the support rollers 8 is the radius of the support roller 8 plus 1/16 in.

FIG. 2A depicts a further embodiment of a support device according to the present invention. In this embodiment, each support roller 8 on a roller shaft 10 is sandwiched between two guide rollers 52. The roller shafts 10 are held within shaft channels 18 in each of the shaft supports 12, rather than the shaft sockets 14 of previous embodiments. Because the roller shafts 8 are in the shaft channels 18, the roller shafts 10 may roll forward and backward along the shaft channels 18 in addition to rotating about their axes. In this manner, the user's ability to use a peripheral device, for example, a computer mouse, is augmented by the additional forward and backward movement available while the user's hand and wrist still maintain contact with the support rollers 8 on the support device 2.

The support rollers 8 may slide along the roller shafts 10 laterally and rotate around the roller shafts 10 continuously. Because the support roller surface 42 is generally made of a soft material, for example, foam, rubber, or a hard sponge, for the user's comfort, if the support roller surfaces 42, as shown in FIG. 2B (or support roller bodies 50 of FIG. 2B), of two adjacent support rollers 8 were to come into contact, the soft support roller surfaces 42 would bind due to friction and rotation would be impaired. The two guide rollers 52 on each roller shaft 10 interact with adjacent guide rollers 52 on adjacent roller shafts 10 to prevent the interface between adjacent support rollers 8. The guide rollers 52 are larger in diameter, for example, by 1/16 in. or more, than the support rollers 8 and are preferably composed of a hard material with a low friction coefficient, for example, plastic, wood, and metal. The guide rollers 52 are fixedly attached on the roller shaft 10 symmetric to adjacent guide rollers 52 on an adjacent roller shaft 10, for example by friction fit or adhesive. The guide rollers 52 thereby rotate with the roller shaft 10 and the distance between the support rollers 8 is controlled by the guide rollers 52 bumping against each other.

This embodiment may be beneficial for a user who sits in a relatively low position. If a user sits in a low position relative to a work surface upon which a computer peripheral device is placed, the user's hand is at an upward angle with the work surface and the heel of the user's hand rubs the work surface. Because the support rollers 8 of the support device 2 in the present embodiment move with the user's hand, the hand is supported during the rolling motion of the support rollers 8 and the rubbing against the work surface is alleviated.

Another embodiment of the support device 2 is shown in FIG. 3. In this instance the support rollers 8 consist of multiple support disks 22 along each roller shaft 10. The actual support is provided by many small disks threaded onto a number of shafts and thus holding the weight of the operator's wrist. A user's hand and wrist have a lower surface area contact with the support roller 8 or supports disks 22 in this version. Exemplary dimensions of a support disk 22 may be 3/8 in. to 1¾ in. in diameter and 1/8 in. to ½ in. in width. The edges of the disks can be rounded off, for example, at radius between 0 in. and ¼ in. As in previous embodiments, the support disks 22 may be made of, for example, plastic, hard foam, rubber, metal, and wood. The support disks 22 may further have a textured surface for greater massaging benefit to the user. There may be between 5 and 16 support disks 22 on a single roller shaft 10 in an exemplary embodiment. The distance between adjacent support disks 22 on a roller shaft 10 may be between, for example, 1/16 in. to ¼ in. or greater. The support disks 22 are fixedly attached to the roller shafts 10, for example, by friction fit or adhesive bonding, and rotate together with the roller shafts 10. As an added benefit, the shaft sockets 14 in this embodiment may also be elongated and outfitted with spring mechanisms to provide vertical play for the support disks 22.

FIG. 4 depicts another embodiment of the invention wherein the support rollers 8 are exchanged for a superficies 20 that supports the hand and wrist of the user. In this embodiment, the shaft supports 12 contain symmetrical arcuate shaft channels 18, which guide at least two roller shafts 10 whose ends are supported therein. Exemplary dimensions of the shaft channels 18 may be 2 in. to 4 in. in length, 3/32 in. to ½ in. in width, and 1/8 in. to ¾ in. in depth, while the radius of the arcuate shape of the shaft channels 18 may be 1½ in. to 4½ in.

The superficies 20 may be a panel attached to and resting on top of the roller shafts 10 or it may be contiguous surface that wraps around the roller shafts 10. The roller shafts 10 generally are positioned along the leading and trailing edges of the superficies 20. If greater structure is required to support the central span of the superficies 20, additional roller shafts 10 may be added to the central portion of the superficies 20. In an alternate embodiment, individual guide wheels may be attached along the lateral edges of the superficies 20 to run along the shaft channels 18 and support the superficies 20. The superficies 20 may be composed of a material that is rigid enough to maintain an arcuate shape to follow the shape of the shaft channel 18, while still providing a desirable tactile surface for the user. For example, plastics or composite materials covered by Neoprene® or a rubber layer may be used as a superficies 20. Exemplary dimensions of the superficies may be 3½ in. to 5½ in. in length, 1½ in. to 3 in. in width, and 1/32" to ½ in. in thickness.

The superficies 20 supports the user's hand and wrist in a natural position. The use of a computer mouse is facilitated by sliding the superficies 20 along the shaft channels 18. The superficies 20 of this embodiment may also be beneficial for a user who sits in a relatively low position. If a user sits in a low position relative to a work surface upon which a computer peripheral device is placed, the user's hand is at an upward angle with the work surface and the heel of the user's hand rubs the work surface. Because the superficies 20 of the support device 2 in the present embodiment moves with the user's hand, the hand is supported during the arcuate motion of the superficies 20 and the rubbing against the work surface is alleviated.

In FIG. 5, another embodiment of the invention is depicted wherein the support rollers 8 function as the roller shafts 10 as well. The support rollers 8 are held within a linear shaft channel 18 formed in the interior, opposing sides of the shaft supports as in FIG. 2A. Exemplary dimensions of the shaft channel 18 may be 2 in. to 4 in. in length, ¼ in. to ¾ in. in height, and 1/8 in. to ¾ in. depth. The support rollers 8 may be cylindrical for ease of rotating and rolling within the shaft channel 18. The support rollers 8 both rotate axially and travel linearly forward and backward within the shaft channels 18. Multiple support rollers 8 may move within the shaft channels 18 situated closely adjacent to each other or spaced apart. Exemplary dimensions of the support rollers in this embodiment may be ¼ in. to ¾ in. in diameter and 3 in. to 6½ in. in length. The support rollers 8 may be composed of a fairly rigid material, for example, metal, wood, and Plexiglas®, as the support rollers 8 must support themselves across the span between the shaft supports 12. In fact, this embodiment may be constructed entirely of wooden parts, therefore offering an environmentally friendly solution.

As an alternative, the support rollers 8 of the embodiment of FIG. 5 might also be placed in shaft channels 18 that are wider apart in distance between the depths of the shaft channels 18 in the shaft supports 12 than the length of the support rollers 8. This configuration allows the support rollers 8 to additionally move laterally as the user moves, as well as rotating and rolling forward and backward. However, to prevent the support rollers 8 from twisting out of the shaft channels 18, caps (not shown) may be provided and affixed within the shaft channels 18, wherein the caps are of a larger internal diameter than the support rollers 8. The caps travel linearly within the shaft channels 18, but are secure, e.g., a lip or tab on the cap snaps into a groove inside the shaft channel 18 as not to fall out. In this manner, the support rollers 8 may move back and forth laterally within the caps, but be. unable to twist and fall out of the shaft channel 18.

In another embodiment as depicted in FIGS. 17A and 17B, the shaft supports 12 are provided with shaft sockets 14", similar to the shaft sockets 14 depicted in FIG. 1C. In this embodiment, however, the shaft sockets 14" are bored or otherwise formed whereby a partial shaft socket 14" is formed near the top of the shaft support 12. A portion 15 of the shaft sockets 14" is of a width of less than the diameter of the support rollers 8 and is open to the top of the shaft supports 12. Because the portion 15 of the shaft sockets 14" open to the top of the shaft support 12 and exposing the shaft socket 14" is narrower than the diameter of the support roller 8, the support roller 8 is unable to slip out of the top of the shaft support 12. In this manner, a surface of the support roller 8 is accessible to the user over the entire length of the support roller 8, providing a wider surface for supporting the user's hand and wrist. The shaft supports 12 may be of a flexible material that allows the support rollers 8 to pop into the shaft sockets 14".

Alternatively, the shaft sockets 14 may be made in this and previous embodiments by forming a hole through the entire width of one or both of the shaft supports 14. In this manner, the support roller 8 (or roller shaft 10) may be pushed through the shaft socket 14 from the exterior side of one of the shaft supports 12 and inserted into the shaft socket 14 in the interior side of the opposing shaft support 12. To ensure the support roller 8 (or roller shaft 10) does not slide out of the shaft socket 14, a stopper may be placed in one or both exterior side openings of the shaft sockets 14 in the shaft supports 12, as necessary.

Another embodiment of the support device 2, which builds upon the embodiments related to FIG. 5 just described, is depicted in FIGS. 6A and 6B. In this embodiment, a support carpet 24 is draped over the support rollers 8. The support rollers 8 in this embodiment are preferably composed of metal 32 or other magnetic material, as shown in FIG. 6D, which may be further coated with a low friction material 30, for example Teflon®. The support carpet 24 is preferably composed of a flexible, magnetic substrate 28 covered by a tactilely pleasing surface 26, for example, Neoprene® foam, plastic, or other sponge-like material. The magnetic substrate of the support carpet 24 is placed against the metal support rollers 8, whereby the support carpet 24 is attached to the support rollers 8 by magnetic force.

Exemplary dimensions of the support carpet 24 may be 4½ in. to 6½ in. in length, ⅛ in. to ⅝ in. in thickness, and of a width ⅛ in. or more less the distance between the shaft supports 12. The support carpet 24 may be square, gently curved, or beveled at the corners, among other configurations. The support carpet 26 may overhang the first support roller 8 on the mouse pad 4 side of the support device 2, for example, up to 1 in., or overhang past the last support roller 8 on the user's side of the support device 2, for example, between 2½ in. to 4 in. The support carpet 24 is extended on the user's side to prevent the user's hand from rubbing a work surface. The user's hand is in contact with the support carpet 24 instead, which moves back and forth on the support rollers 8.

In an alternate embodiment, the support rollers 8 may be under tension by a spring force that works to pull the support rollers 8 toward the user within the shaft channel 18. By pulling the support rollers 8 back, the support carpet 24 is likewise pulled back due to the magnetic attachment force between the support rollers 8 and the support carpet 24, thereby maintaining the majority of the support carpet 24 between the user's hand and wrist and the work surface. The spring force may be provided by simple rubber springs, for example, rubber bands, looped around each end of the leading support roller 8 closest to the mouse pad 6, threaded in the space between the support carpet 24 and the shaft supports 12, and fastened at the opposite end to the base 4 at a point toward the user end of the support device 2. In this manner, the spring force of the rubber band exerts a retraction force on the leading support roller 8 to which it is attached without interfering with its rotational movement. The spring force is additionally asserted upon the support rollers 8 behind the leading support roller 8, as the other support rollers 8 are necessarily pulled along by the leading support roller 8 as it is retracted.

FIGS. 7A and 7B depict another novel embodiment of the present invention wherein the support device 2 provides a support structure 60 for ergonomically supporting the hand and wrist of a user while the user is operating a computer peripheral device. The support structure 60 of FIGS. 7A and 7B provides massaging members formed as a group of bulbous stanchion supports 62 separated by valleys 64 between the stanchion supports. The bulbous stanchion supports 62 facilitate use of the mouse by bending forward, backward, laterally, and otherwise, accommodating a full range of motion while providing massage benefits to the hand and wrist. The bulbous stanchion supports 62 may be arrayed uniformly, for example, as the parallel wave-like structures depicted in FIGS. 7A and 7B, or randomly in other configurations. The bulbous stanchion supports 62 may be formed, for example, of Neoprene® and other foams, hard sponge, rubber, and plastics. The support structure 60 may be attached to the base 4, for example, by adhesive, Velcro®, or snap fitting into a defined area on the base 4. Exemplary dimensions of the support structure 60 may be 3 in. to 6 in. length, 1 in to 4½ in. in width, and ½ in. to 2 in. in height. The length and width dimensions may be made to accommodate any size base 4 of a support device 2.

Another embodiment of a support structure 60 for use with the support device 2 is depicted in FIGS. 8 and 9. In this embodiment, vertical support columns 66, which support the hand and wrist and facilitate forward, backward, lateral, and other movement of the user, provide massaging members accommodating a full range of motion. The column supports 66 facilitate use of a computer mouse, for example, by bending in both the horizontal and vertical planes, thereby making possible the support of a user's hand while moving the computer mouse. The support columns 66 may be arrayed uniformly or randomly as desired. The column supports 66 may be formed, for example, of Neoprene® and other foams, hard sponge, rubber, and plastics. The support structure 60 may be attached to the base 4, for example, by adhesive, Velcro®, or snap fitting into a defined area on the base 4. Exemplary dimensions of the support structure 60 may be 3 in. to 6 in. length, 1 in to 4½ in. in width, and ⅜ in. to 2 in. in height. The length and width dimensions may be made to accommodate any size base 4 of a support device 2.

Exemplary shapes of the column supports 66 may be generally circular, elliptical, or parallelograms in horizontal cross-sections. The horizontal cross-sections of the column supports 66 may further be of different areas at different heights. The column supports 66 may rise at an angle from the base 4, for example, between 40 degrees and 90 degrees. The top surface 68 of the column support may be, for example, planar, pyramidal, ellipsoidal, conical, spherical, or combinations thereof. The top surfaces 68 of the column supports 66 may further be textured for greater tactile sensation. If the top surface 68 of the column supports is planar, the top surfaces 68 may be formed at angles to, rather than parallel with, the base. The angles of the top surfaces 68 may be changed in combination with changes in height of the column supports 66 to create a macro top-surface effect across all the column supports 66.

Several additional features for use in combination with the present invention are disclosed in FIGS. 10A and 10B. FIG. 10A depicts a support device 2 raised from a work surface through the provision of a base elevator 74 for users that would like the support device 2 to be at a raised angle on the user side of the support device 2 for greater comfort. A base elevator 74 is provided on both sides of the support device to create a stable platform. The base elevators 74 may retract into recesses 76 in each of the shaft supports 12 as shown. In the exemplary embodiment of FIG. 10A, an angular position screw is used to fulfill the function of the base elevator 74. The angular position screws may be screwed in and out of the recess 76 to a desired height and angle. Unscrewing the screws causes them to protrude from the bottom of the base 4, placing the base 4 at an angle, for example, from 0 to 15 degrees, with the work surface.

An additional embodiment for raising the mouse pad 6 end of the support device 2 at a particular angle with respect to a work surface to increase comfort is depicted in FIG. 10B. One or more base legs 70 may be stowed in recesses 72 in the bottom of the base 4. In this aspect, the base leg 70 may be lowered from the base 4 by rotating the base leg 70 around a shaft by 90 degrees plus 'A' degree. The end of the base leg 70 at the shaft interface may be generally rounded, except for a tab at the tip. Furthermore, there may be two apertures in the base 4 corresponding to the fully open and closed positions of the base leg 70 into which the tab slips and acts to stop further rotational movement. The foot 71 of the base leg 70, which has contact with the work surface, may be coated with rubber or other frictional layer to prevent the support device 2 from slipping. The base legs 70 may be telescopic and extracted to a desired length, for example, achieving an angle of between 10 and 30 degrees between work surface and the support device.

In another alternative embodiment, also depicted in FIGS. 10A and 10B, a base pad 78 may be provided to counteract a user's hands from accidentally rolling off the support rollers, for example, where a user has elevated the mouse pad 6 end of the support device 2. The base pad 78 may not be necessary for use in every hand position. If a user sits high enough, the user's elbow may be at the same height as the shaft supports 12 (or in a higher position), so the user's hand won't accidentally roll off the support rollers 8. However, if a user prefers a lower chair position, the support device may be relatively higher than the user's elbow and thus the user's hand now has a possibility of accidentally rolling off the support rollers 8. The base pad 78 may fit into the base 4 between the shaft supports 12 behind the support rollers 8. The base pad 78 may be attached to each the shaft support 12, for example, by a tab that fits into a groove on corresponding side of the shaft support 12, or by Velcro® between the bottom of the base pad 78 the base 4. Exemplary dimensions of the base pad 78 may be ⅜ in. to ¾ in. in height, ½ in. to 1½ in. in width, and the length may be the distance between the two shaft supports 12 less ¹⁄₁₆ in. or more. The edges of the base pad 78 may be rounded-off at the top of the user's side by ¼ in. to 1 in. radius. The rounding may be either the same dimension at all points, varying but symmetrical, or asymmetrical. A user may also raise the overall height of the base pad 78 by first inserting spacer under the actual base pad 78. The dimensions of this piece should be identical to the hand support, with the exception of rounding top corner.

It is contemplated that the disclosed invention may be used with and is easily adapted to other computer peripheral items in addition to the computer mouse pad embodiments described above. For example, the support device 2 could take the form of a computer touch pad as depicted in FIG. 11. Any of the previous ergonomic and massaging support surfaces described herein may be used to create a computer touch pad embodiment of the support device 2. In FIG. 11, a support device 2 with support rollers 8 on roller shafts 10 mounted in roller supports 12 is shown. In place of a mouse pad, the various actuation buttons for a typical computer touch pad are integrated into the support device 2. Such actuation buttons may include, for example, a pointer touch pad 80, a right click pad 82, a left click pad 84, and a scroll wheel 86. Such a touch pad support device 2 may be connected to a computer interface via a wire or a wireless connection.

As another exemplary application, each of the embodiments of the invention described above may be used in conjunction with a computer keyboard. Examples of computer keyboard embodiments are shown in FIGS. 12A, 12B, and 13. FIGS. 12A and 12B depict keyboard trays 90 for supporting computer keyboards. Similar to the support devises previously described, the keyboard tray 90 consists of a tray base 92 for supporting a computer keyboard. The tray base 92 may be constructed of plastics, composites, metal, wood, or any other sufficiently strong and rigid material able to support a computer keyboard. As before, support rollers 8 are mounted on roller shafts 10, which are, in turn held by shaft supports 12. As before, the support rollers 8 may freely rotate around or slide along the roller shafts 10 as desired by the user. There may be on or more roller shafts 10 mounted on the keyboard tray 92 and each roller shaft 10 may support one or more support rollers 8. When two support rollers 8 are provided on a single roller shaft 10, the support rollers may be configured to attach to and separate from each other easily, for example, by snap fastening or Velcro®. This combination may be helpful if a user types with only one hand, for example, using the other hand to manipulate a computer mouse, or if the user types with hands and wrists very close together. In FIG. 12B, a contoured roller 9 is depicted as an alternative to the generally cylindrical support rollers 8. The contoured roller 9 may, for example, be thicker on one end and transition over the middle third of the contoured roller 9 to a thinner portion of the roller on the second end. Such a contoured roller 9 emulates the angle of a user's hands when working at a computer keyboard.

FIG. 13 depicts the invention fully integrated into a computer keyboard 94. A groove 96 is provided in the keyboard 94 between the shaft supports 12 and underneath the support rollers 8 to provide appropriate clearance for the support rollers 8. In both the keyboard tray 90 and the integrated keyboard 94, a base pad 78 as previously described may help in front of the support rollers 8 to reduce the occurrence of a user's hands or wrists slipping off the support rollers 8 or other support surfaces. Both the keyboard tray 90 and the integrated keyboard 94 may further be provided with base legs 70 recessed within the tray base 92, or the bottom of the integrated keyboard 94, and base elevators 74 recessed within the shaft supports 12 to allow users to adjust the height of the keyboard tray 90 or integrated keyboard 94.

It should further be apparent that the invention may be modified to provide the ergonomic support to natural keyboards as well. A center shaft support 12 to hold converging roller shafts 10 or support rollers 8 may be utilized. Alternatively, a separate set of support rollers 8 and shaft supports 10 may be provided for each side of a natural keyboard.

FIGS. 14A, 14B, and 15 depict yet another embodiment of the invention in combination with a chair 100. For example, because of the particularities of an office configuration, there may not be an adequate work surface to comfortably operate a computer mouse, much less enjoy the ergonomic benefits of the invention disclosed. In such an environment, a convenient location for using the computer mouse in the least amount of space, while still taking advantage of the ergonomic benefits of the present invention is desirable. Also, many users would like ergonomic support for their elbow and forearm as well. In some instances, for example, when surfing the World Wide Web or playing a computer game, the user is merely operating a computer mouse to click desired hyperlinks or interact with the game, and would prefer to be in a relaxed position, rather than hunched over a mouse pad on a work surface.

In this embodiment of the invention, the support device 2 is attached to the arm 98 of a chair 100, alone or in combination with an elbow support 116. Through the disclosed invention, the user may sit comfortably in a chair using any preferred computer interface device while the user's elbow, wrist, and hand are comfortably supported. The elbow support 116 may be composed of any of the support surfaces previously described with respect to supporting a user's hand and wrist. As depicted, the elbow support 116 includes one or more support rollers 8 mounted on respective roller shafts 10, held by shaft supports 12. The elbow support 116 is mounted on top of an elbow support base 102, which may be connected via hinges 106 to the support device 2. The elbow support base 102 is fixedly connected to the chair arm 98 by a chair mount 104 using any of several methods, for example, screwing, bolting, clasping, adhering, and welding. By connecting the elbow base support to the chair arm 98, a stable platform for resting one's elbow, wrist, and hand and operating a computer peripheral device is provided.

An exemplary hinge connection 106 between the support device and the elbow support base 116 is depicted in FIG. 14B. The hinge connection 106 consists of a first hinge 108a positioned between and attached to a support device mount 110 and an intermediate mount. The support device mount 110 is also securely attached to the base 4 of the support device 2. The intermediate plate 112 is further securely attached to the second hinge 108b. The second hinge 108b is next attached to the elbow base mount 102. The hinge connection 106 allows the support device 2 to fold upward (alternate position A) while rotating about the first hinge 108a until the support device 2 contacts the intermediate plate 112 (alternate position B). Next, the support device 2 rotates about the second hinge 108b to fold flat against the elbow support 116 (alternate position C). The hinge connection 106 thereby allows the combination of the support device 2 and the elbow support 116 to be conveniently stowed away if necessary.

FIG. 15 depicts a further convenient storage alternative for moving the elbow support 116 to an inconspicuous location. Again, the elbow support 116 is mounted on the chair arm 98 by chair mount 104 via an intermediary dual action hinge 118. The dual action hinge 118 allows the elbow support 116 to be rotated first to a vertical position (alternate position D), and then rotated second forward or backward in the same vertical plane whereby the elbow support is stowed alongside the chair 100, below the height of the chair arm 98 (not shown). It should be further apparent that the dual action hinge 118 could be used in combination with the hinge connection 106 of FIGS. 14A and 14B to stow the combination support device 2 and elbow support 116 alongside the chair 110 as well.

While the inventive ergonomic and massaging computer interface support surfaces and devices are described herein in the context of particular embodiments of interface equipment, specifically mouse pads and keyboard rests, these embodiments are not intended to limit the application of the invention disclosed to these discrete embodiments. Rather, it should be understood that those skilled in the art will appreciate the application of this invention to other embodiments of computer interface support surfaces. It is also understood that while various measurements and tolerances are provided herein with respect to the particular embodiments described, other embodiments not limited to such measurements and tolerances remain within the scope of this invention.

What is claimed is:

1. An ergonomic support surface adapted to support a user's hand or wrist while the user's hand or wrist moves in contact with the ergonomic support surface to control a hand activated device, the ergonomic support surface comprising:
    a base;
    a supporting means for supporting the user's wrist or hand connected to the base, wherein the supporting means further comprises:
       at least one massaging member, wherein
       the massaging member imparts a massaging action to the user's hand or wrist while the user's hand or wrist moves in contact with the supporting means;
    wherein the supporting means further comprises:
       a first shaft support connected to the base and containing a first socket; and
       a second shaft support spaced apart from the first shaft support, connected to the base, and containing a second socket; and wherein
       the massaging member comprises:
          a shaft with a first end and a second end, wherein
             the first end of the shaft is housed within the first socket and supported above the base by the first shaft support; and
             the second end of the shaft is housed within the second socket and supported above the base by the second shaft support; wherein
          the shaft rotates freely within the first socket and the second socket in response to movement by the user's hand or wrist in contact with the shaft; and wherein
          the shaft moves vertically within the first socket and the second socket with respect to the base in response to movement by the user's hand or wrist in contact with the shaft.

2. The ergonomic support surface of claim 1, wherein each of the first socket and the second socket houses a spring force means for providing resistance force against vertical movement by the shaft toward the base.

3. The ergonomic support surface of claim 1, wherein the base comprises a recessed area substantially beneath the position of the shaft.

4. The ergonomic support surface of claim 1, wherein the base comprises a recessed area substantially beneath the position of the massaging member.

5. The ergonomic support surface of claim 3 or 4, wherein the recessed area further comprises an aperture.

6. The ergonomic support surface of claim 1 further comprising a means for attaching the ergonomic support surface to an arm of a chair.

7. The ergonomic support surface of claim 1, further comprising a base pad.

8. An ergonomic support surface adapted to support a user's hand or wrist while the user's hand or wrist moves in contact with the ergonomic support surface to control a hand activated device, the ergonomic support surface comprising:
- a base;
- a supporting means for supporting the user's wrist or hand connected to the base, wherein the supporting means further comprises:
  - at least one massaging member, wherein
    - the massaging member imparts a massaging action to the user's hand or wrist while the user's hand or wrist moves in contact with the supporting means;
- a first shaft support connected to the base and containing a first socket;
- a second shaft support spaced apart from the first shaft support, connected to the base, and containing a second socket;
- a shaft with a first end and a second end, wherein
  - the first end of the shaft is housed within the first socket and supported above the base by the first shaft support; and
  - the second end of the shaft is housed within the second socket and supported above the base by the second shaft support; and wherein
- the massaging member comprises:
  - a carpet positioned upon the shaft;
  - wherein
  - the shaft comprises a metal; and
  - the carpet comprises a substrate of magnetic material; wherein
  - the carpet adheres to the shaft.

9. The ergonomic support surface of claim 8, further comprising a base pad.

10. An ergonomic support surface adapted to support a user's hand or wrist while the user's hand or wrist moves in contact with the ergonomic support surface to control a hand activated device, the ergonomic support surface comprising:
- a base;
- a supporting means for supporting the user's wrist or hand connected to the base, wherein the supporting means further comprises:
  - at least one massaging member, wherein
    - the massaging member imparts a massaging action to the user's hand or wrist while the user's hand or wrist moves in contact with the supporting means;
- a first support connected to the base and containing a first channel;
- a second support spaced apart from the first support, connected to the base, and containing a second channel; and wherein
- the massaging member comprises:
  - a superficies panel further comprising:
    - a first side;
    - a second side;
    - a first channel engagement means for mounting on the first side; and
    - a second channel engagement means for mounting on the second side; wherein
    - the first channel engagement means engages the first channel; and
    - the second channel engagement means engages the second channel; and
    - the superficies panel moves between the first support and the second support along the first channel and the second channel in response to movement by the user's hand or wrist in contact with the superficies panel; and
  - wherein each of the first channel and the second channel further comprises an arcuate channel.

11. The ergonomic support surface of claim 10, further comprising a base pad.

12. An ergonomic support surface adapted to support a user's hand or wrist while the user's hand or wrist moves in contact with the ergonomic support surface to control a hand activated device, the ergonomic support surface comprising:
- a base;
- a supporting means for supporting the user's wrist or hand connected to the base, wherein the supporting means further comprises:
  - at least one massaging member, wherein
    - the massaging member imparts a massaging action to the user's hand or wrist while the user's hand or wrist moves in contact with the supporting means;
- a supplemental ergonomic support surface adapted to support the user's elbow or forearm while the user's elbow or forearm moves in contact with the supplemental ergonomic support surface to control a hand activated device, the supplemental ergonomic support surface comprising:
  - a supplemental base attached to the base;
  - a supplemental means for supporting the user's elbow or forearm connected to the supplemental base, wherein the supplemental supporting means further comprises:
    - at least one elbow massaging member, wherein
      - the elbow massaging member imparts a massaging action to the user's elbow or forearm while the user's elbow or forearm moves in contact with the supplemental supporting means.

13. The ergonomic support surface of claim 12 further comprising a hinge connector attaching the base and the supplemental base, wherein
the ergonomic support surface is able to pivot about the hinge connector to fold against the supplemental ergonomic support surface.

14. The ergonomic support surface of claim 12 further comprising a means for attaching the supplemental ergonomic support surface to an arm of a chair.

15. The ergonomic support surface of claim 14, wherein the means for attaching the supplemental ergonomic support surface further comprises a hinge means for pivoting the ergonomic support surface and the supplemental ergonomic support surface from atop the arm of the chair to beside the arm of the chair.

16. The ergonomic support surface of claim 12, further comprising a base pad.

17. A computer mouse pad device with an ergonomic support surface adapted to support a user's hand or wrist while the user's hand or wrist moves in contact with the ergonomic support surface to control a hand activated device such as a computer mouse, the computer mouse pad device comprising
- a base defining a recessed area for receipt of a mouse pad;
- a shaft with a first end and a second end;
- a first shaft support connected to the base and containing a first socket;
- a second shaft support spaced apart from the first shaft support, connected to the base, and containing a second socket; wherein
- each of the first socket and second socket further comprises a recessed channel defined within an interior wall of each of the first and second shaft support, wherein the recessed channel is open to a top of each respective shaft support and defines a back wall, opposing sidewalls, and a bottom wall opposite the top; and the recessed channel further defines a narrowed portion between the opposing sidewalls spaced above the bottom wall; and wherein the first end of the shaft is housed within the first socket, supported above the base by the bottom wall in the recessed channel of the first shaft support, and retained within the first socket by the narrowed portion of the opposing sidewalls; and the second end of the shaft is housed within the second socket, supported above the base by the bottom wall in the recessed channel of the second shaft support, and retained within the second socket by the narrowed portion of the opposing sidewalls.

18. The computer mouse pad device of claim 17 further comprising a roller positioned coaxially around the shaft.

19. The computer mouse pad device of claim 18 further comprising an additional shaft with a first end and a second end, wherein the first end of the additional shaft is housed within an additional socket in the first shaft support and supported above the base by the first shaft support; and the second end of the additional shaft is housed within and additional socket in the second shaft support and supported above the base by the second shaft support; and an additional roller positioned coaxially around the additional shaft.

20. The computer mouse pad device of claim 18, wherein the roller rotates freely about the shaft.

21. The computer mouse pad device of claim 18, wherein the roller moves axially along the shaft between the first shaft support and the second shaft support.

22. The computer mouse pad device of claim 18 further comprising a mouse pad positioned within the recessed area of the base.

23. The computer mouse pad device of claim 17 further comprising a mouse pad positioned within the recessed area of the base.

24. An ergonomic support surface adapted to support a user's hand or wrist while the user's hand or wrist moves in contact with the ergonomic support surface to control a hand activated device, the ergonomic support surface comprising:

a base;

a supporting means for supporting the user's wrist or hand connected to the base, wherein the supporting means further comprises:

at least one massaging member, wherein the massaging member imparts a massaging action to the user's hand or wrist while the user's hand or wrist moves in contact with the supporting means;

a first shaft support connected to the base and containing a first socket;

a second shaft support spaced apart from the first shaft support, connected to the base, and containing a second socket;

a shaft with a first end and a second end, wherein the first end of the shaft is housed within the first socket and supported above the base by the first shaft support; and the second end of the shaft is housed within the second socket and supported above the base by the second shaft support; and wherein the massaging member comprises:

a roller positioned coaxially around the shaft, wherein the shaft moves vertically within the first socket and the second socket with respect to the base in response to movement by the user's hand or wrist in contact with the shaft.

25. The ergonomic support surface of claim 24, wherein each of the first socket and the second socket houses a spring force means for providing resistance force against vertical movement by the shaft toward the base.

* * * * *